United States Patent

Hills

[15] 3,675,060
[45] July 4, 1972

[54] INDUCTION MOTORS

[72] Inventor: Brian Hills, Pentire, Knockholt, Sevenoaks, Kent, England

[22] Filed: Dec. 3, 1970

[21] Appl. No.: 94,692

[30] Foreign Application Priority Data

Dec. 9, 1969 Great Britain...................60,032/69

[52] U.S. Cl............................................310/172, 310/211
[51] Int. Cl..............................................H02k 17/10
[58] Field of Search...........................310/162–170, 211, 310/163, 172

[56] References Cited

UNITED STATES PATENTS 711,300 10/1902 Earle.................................310/211 X

FOREIGN PATENTS OR APPLICATIONS 418,174 10/1934 Great Britain.......................310/163

*Primary Examiner*—D. X. Sliney
*Attorney*—Larson, Taylor & Hinds

[57] ABSTRACT

An induction motor having its rotor symmetrically outside its stator has the rotor formed of a cup-shaped ferromagnetic member, which has an annular array of fingers encircling the stator and projecting from a base which is axially beyond the stator, there being a squirrel cage conductor system disposed solely at the base end of the rotor. The stator consists of a pole-forming ring with shading band sets and adjacent high reluctance paths and with internal energizing coils.

14 Claims, 11 Drawing Figures

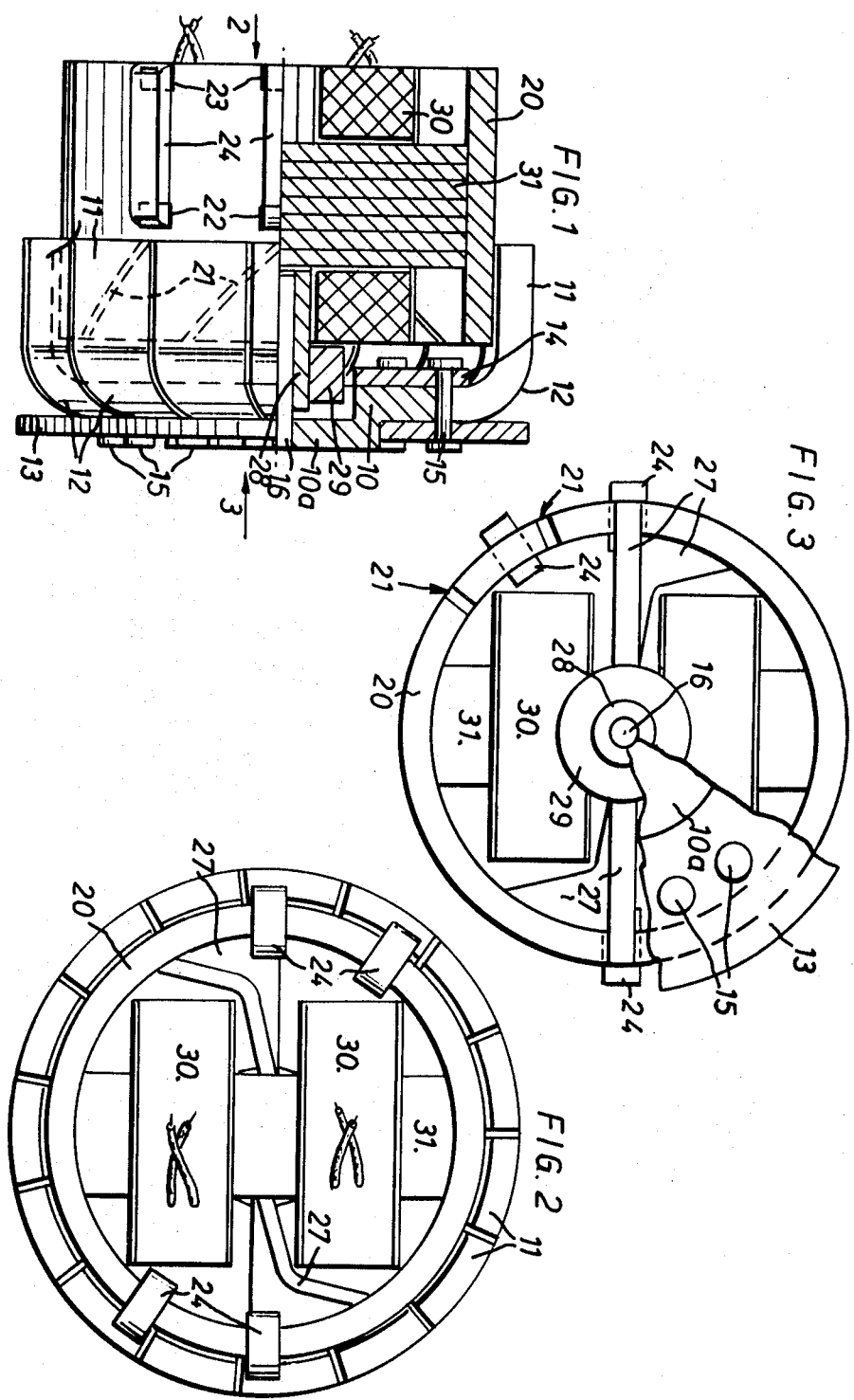

PATENTED JUL 4 1972

INDUCTION MOTORS

DESCRIPTION

This invention relates to induction motors and is concerned primarily though not exclusively with small motors of this kind as may be used for driving air-moving fans, blowers in hair dryers and the like.

Motors of this kind are of two types, that is the type in which the stator surrounds the rotor with the energizing coils offset from the rotor or disposed symmetrically about the rotor, and another type in which the stator is symmetrically within the rotor.

Symmetrical type induction motors have a basic advantage that they can be located in the center of the rotating parts of the fan or like and so may occupy less space than an equivalent motor with offset coils.

This invention is for improvements in the construction of symmetrical induction motors of the class having the stator within the rotor, the improvements leading to advantages in design, or manufacture or operation or more than one of these.

One important novelty concerns the external rotor of this class of symmetrical induction motor. The rotor has its ferromagnetic material in one piece cupped so as to have a base and an array of circumferentially spaced fingers projecting axially from the base and has its conductors located at or adjacent the junction of the fingers with the base.

In practice only the ferromagnetic fingers need extend axially outside the stator, the base and conductors being axially beyond one end of the stator.

The gaps in the ferromagnetic material between the fingers may be truly axial, i.e. parallel to the rotational axis, or may be skewed with respect to it. The gaps may if desired be filled with a non-magnetic material or instead the fingers may be interconnected by relatively radially thin webs integral with the fingers, the webs affording relatively high reluctance paths compared with the fingers. It may, however, be preferred to leave the gaps unfilled so that the motor is self ventilating, the fingers acting like fan blades.

The conductors may be simply formed in any of a number of advantageous ways. One way of providing the conductors is to have rings, e.g. of copper or aluminum, lying against opposite faces of the base and joined electrically by rivets or strips of a like material accommodated in the gaps between the roots of the fingers, or in holes formed in the base. Another way of forming the conductors is to die cast these in situ in a single operation.

The above rotor construction also allows the rotor to be supported by a single short spindle engaging a bearing bush at one side of the stator. A further bearing may be provided on the motor casing if necessary or desired.

Also parts such as fan blades can be mounted directly on the rotor avoiding expensive hubs and set screws.

Another novelty of the rotor, which leads to substantial advantages relative to the design and manufacture of the stator, is that the fingers may have an axial extent substantially less than the corresponding dimension of the stator so that part of the stator is not encircled by the rotor. This arrangement facilitates mounting of the shading bands of the stator. Such shading bands and the formation of slots in the stator to provide high reluctance paths are required to form the stator poles.

Another important innovation consists in the avoidance of ferromagnetic laminations in the rotor and in the stator ring, each being made from a single thickness of ferromagnetic material. The single thickness stator ring is conveniently cylindrical and can be slotted for the reception of shading bands and to provide circumferentially close to one side of the shading band positions high reluctance paths. The sets of shading bands and high reluctance paths define the main pole areas, i.e. areas of main magnetic flux.

The core and energizing windings can be readily accommodated within such a cylindrical stator.

Some forms of small symmetrical induction motor are, by way of example, illustrated in the accompanying drawings in which:

FIG. 1 is a view, partly in section, of a first form of the motor,

Figures 1A, 4:
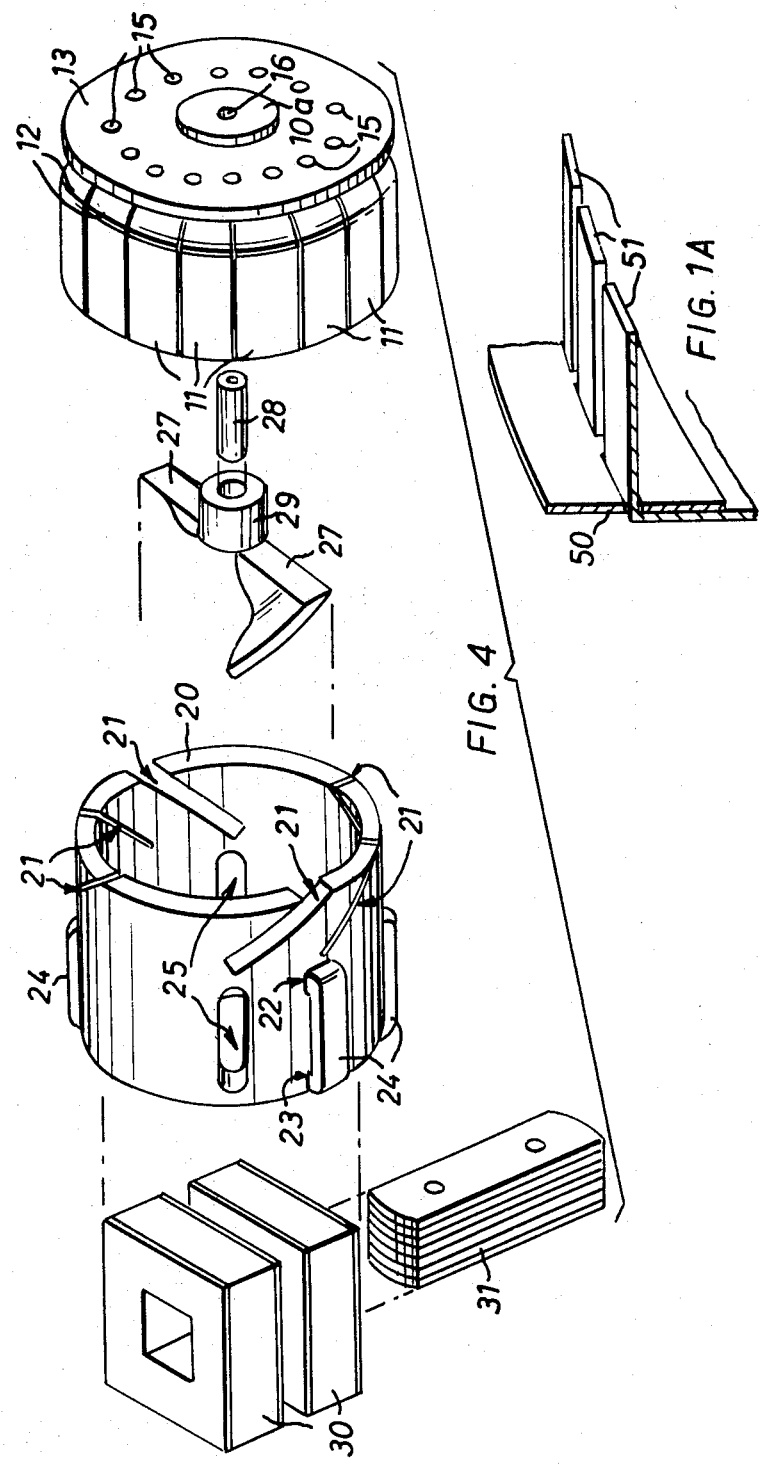
FIG. 1A shows a modification.
Figure 5:
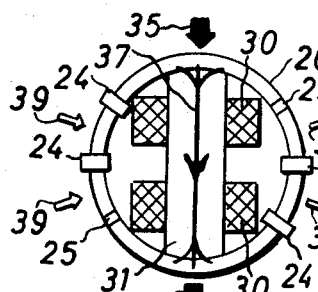
Figure 6:
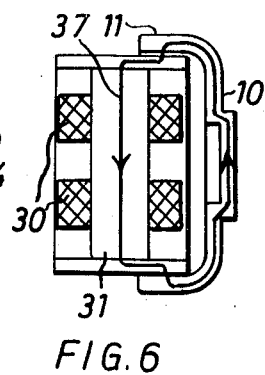
Figure 7:
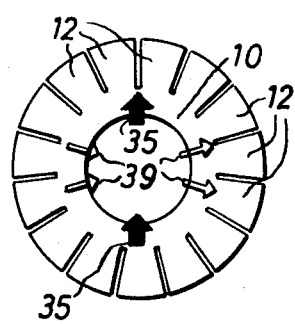
Figure 8:
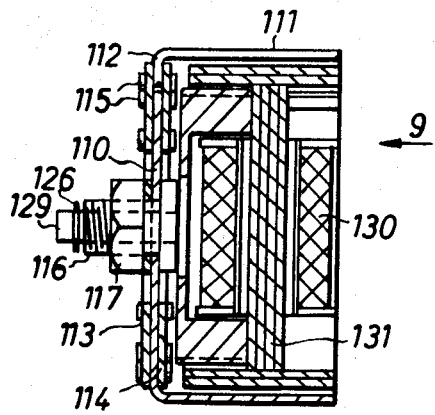
Figure 9:
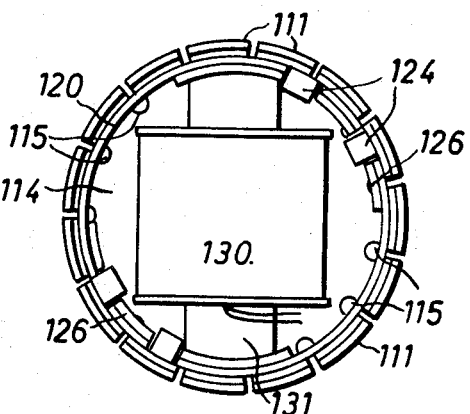
Figure 10:
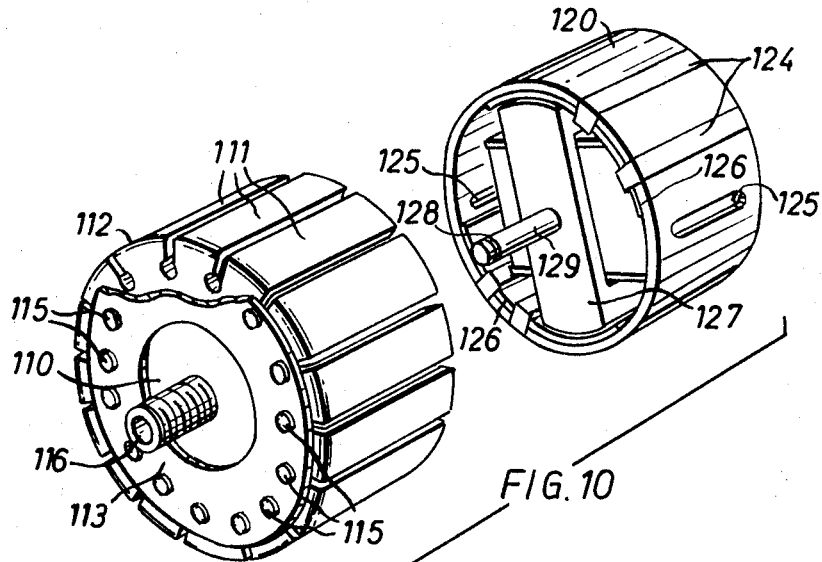

FIGS. 2 and 3 are views in the direction of arrows 2 and 3 respectively on FIG. 1, and FIG. 4 is an exploded view of this motor, FIGS. 5 to 7 illustrate diagrammatically the direction of magnetic flux during one half cycle, and FIGS. 8 to 10 are respectively an axial section, a view in the direction of arrow 9 on FIG. 8 and an exploded perspective view of a second form of motor.

The rotor of the motor illustrated in FIGS. 1 to 7 comprises a cup-like ferromagnetic part which is say deep drawn from sheet material. This part has a base 10 and an array of circumferentially spaced fingers 11 which extend parallel to the rotational axis from curved roots 12 and the gaps between which are unoccupied by solid material. The center of the base 10 is formed as a boss 10a to locate a highly electrically conductive flat ring 13, conveniently of copper or aluminum, which ring 13 is electrically connected to a second such ring 14 by a series of highly electrically conductive rivets 15 extending through the gaps between the roots 12. The rings 13, 14 and rivets together form a squirrel cage type conductor system. This may alternatively be formed by die casting, or (see FIG. 1A) by threading a latticed disc 50 over the fingers 51 and then deforming the disc to clench it in position.

The rotor has a short spindle 16 secured centrally to the boss 10a. When required the spindle may be so formed as to drive a load.

The stator comprises an open-ended cylindrical pole ring 20, constituted by a single thickness of ferromagnetic material. The ring 20 has two main pole areas which are spaced from each other by two sets of three skew slots 21 extending part way across it within that portion thereof which is encircled by the fingers 11, and within that portion not encircled by the fingers the ring has two pairs of slots 22 with axially aligned notches 23 to locate shading bands 24, and axial slots 25 axially beyond the end of one end slot 21 of each set. The axial slots 25 and associated end slots 21 provide high reluctance paths to one side of each set of shading bands. These end slots 21 are also utilized to receive the ends of vane-like arms 27 supporting a bored boss 29 which receives a bush bearing 28 for the spindle 16.

The shading bands 24 may be formed in any convenient way for instance being die-cast in situ, this being readily possible as the fingers 11 project only part way across the ring 20, somewhat less than half way across the ring in the present embodiment, so that the bands 24 can stand proud of the ring surface.

The stator also comprises a pair of energizing coils 30 which are conveniently square and are mounted in spaced relation on a core 31 of corresponding section, the core 31 consisting of a number of insulated laminae. The ends of the core 31 fit closely against the inner surface of the ring 20.

The direction of magnetic flux during one half cycle is illustrated in FIGS. 5 to 7, the main flux direction being indicated by solid arrows 35 and lines 37 and the hollow arrows 39 indicating the flux path of the flux which has passed through the shading bands.

Referring now to FIGS. 8 to 10, the rotor of the motor as in the previous construction comprises a cup-shaped ferromagnetic member 110 whereof the skirt is divided into fingers 111 connected to a central portion of its base by roots 112 and further comprises a conductive system including flat rings 113, 114 and connector pieces 115 extending through the gaps between the roots 112. The rotor has at the center of the base a hub formed by a bush 116 which is held in position by a nut 117.

The stator has a cylindrical pole ring 120 of ferromagnetic material with axially directed shading bands 124 and a highreluctance-path-forming slots 125, a laminated core 131 and single energizing coil 130. The pole ring 120 is locally stiffened in the region of the shading bands 124 and slots 125 by further ferromagnetic pieces 126 which are brazed in position. Since the rotor has an axial length substantially equal to that of the stator, the shading bands 124 are flush with the outer surface of the pole ring 120 and project inwards from it.

The stator is also fitted with a bridge piece 127 which carries a fixed spindle 129 on which the bush 116 is rotatively engaged. The spindle 129 is formed with a groove 128 for receiving a spring circular slip by which the rotor is prevented from becoming detached from the spindle.

As compared with conventional designs, the above constructional features of the rotor and stator allow each to be readily and economically manufactured, while avoiding excessive eddy-current losses. The construction also allows a high rate of heat loss due to the extensive exposed areas of ferromagnetic material and to the ventilating effect of the rotor which acts like a fan. It is thought also that these advantages can be achieved without loss of efficiency due to the short length rotor and the unusual disposition of the rotor conductors.

I claim:

1. A symmetrical induction motor comprising a stator including a cylindrical stator ring, shading bands provided at circumferentially spaced positions around the stator ring and means for providing high reluctance paths adjacent the shading bands; and a ferromagnetic rotor comprising a single piece of ferromagnetic material cupped so as to have a base and an array of circumferentially spaced fingers projecting axially from the base outside the external surface of the stator ring in radially spaced relationship thereto, and a plurality of conductors located at or adjacent the junction of the fingers with the base, the base and the conductors being axially beyond one end of the stator ring.

2. A symmetrical induction motor according to claim 1, the gaps formed in the ferromagnetic material between the fingers being parallel to the rotational axis.

3. A symmetrical induction motor according to claim 1, the gaps formed in the ferromagnetic material between the fingers being skewed with respect to the rotational axis.

4. A symmetrical induction motor according to claim 1, the gaps being unfilled so that the motor is self ventilating.

5. A symmetrical induction motor according to claim 1, wherein the gaps are filled with a non-magnetic material.

6. A symmetrical induction motor according to claim 1, wherein the fingers are interconnected by relatively radially thin webs integral with the fingers, the webs affording relatively high reluctance paths compared with the fingers.

7. A symmetrical induction motor according to Claim 1, wherein the conductors of the rotor comprise rings of a highly conductive metal lying against opposite faces of the base and joined electrically by elements of a like material extending through the base adjacent the roots of the fingers.

8. A symmetrical induction motor according to claim 1, the conductors of the rotor being cast in situ from a highly conductive metal such as copper or aluminum.

9. A symmetrical induction motor according to claim 1, the motor being supported from the stator at one side thereof by a bearing arrangement comprising a short spindle engaged in a bush.

10. A symmetrical induction motor according to claim 1, wherein the fingers have an axial extent substantially less than the corresponding dimension of the stator so that part of the stator is not encircled by the rotor.

11. A symmetrical induction motor according to claim 10, wherein the stator comprises a ring of ferromagnetic material with energizing means housed within it, the ring having a first portion extending axially within the rotor fingers and a second portion extending axially beyond the rotor, and wherein the stator poles are formed by slots in the ring and by shading bands provided in the second portion of the ring.

12. A symmetrical induction motor according to claim 11, wherein the second portion of the ring has diametrically disposed pairs of shading bands and diametrically disposed slots circumferentially to one side of the shading bands and the first portion of the ring has skew slots in it, the skew slots in the first portion and the shading bands and slots in the second portion having their adjacent ends axially aligned, thereby to form high reluctance paths between main pole areas of the stator.

13. A symmetrical induction motor according to claim 1, wherein the stator ring is slotted for the reception of shading bands and to provide circumferentially close to one side of the shading band positions high reluctance paths.

14. A symmetrical induction motor according to claim 1, wherein energizing windings are accommodated within the stator ring on a laminated core extending diametrally across the stator ring.

* * * * *